United States Patent
Rapp et al.

(10) Patent No.: US 9,789,834 B2
(45) Date of Patent: Oct. 17, 2017

(54) METHOD AND CONTROL UNIT FOR TRIGGERING AT LEAST ONE PASSENGER PROTECTION MEANS

(71) Applicant: Robert Bosch GmbH, Stuttgart (DE)

(72) Inventors: Markus Rapp, Birkenfeld (DE); Ralf Henne, Sachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 257 days.

(21) Appl. No.: 14/029,507

(22) Filed: Sep. 17, 2013

(65) Prior Publication Data

US 2014/0081526 A1  Mar. 20, 2014

(30) Foreign Application Priority Data

Sep. 17, 2012  (DE) .................. 10 2012 216 529

(51) Int. Cl.

| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B60R 21/01* | (2006.01) |
| *B60R 21/0136* | (2006.01) |
| *B60R 21/013* | (2006.01) |

(52) U.S. Cl.
CPC ............ *B60R 21/01* (2013.01); *B60R 21/013* (2013.01); *B60R 21/0136* (2013.01)

(58) Field of Classification Search
None
See application file for complete search history.

(56) References Cited

U.S. PATENT DOCUMENTS

| | | | |
|---|---|---|---|
| 6,422,596 B1 | 7/2002 | Fendt et al. | |
| 2006/0064217 A1* | 3/2006 | Grasshoff | ............... B60R 21/01 701/45 |
| 2007/0035182 A1* | 2/2007 | Wellhoefer | ......... B60R 21/0136 307/120 |

(Continued)

FOREIGN PATENT DOCUMENTS

| | | |
|---|---|---|
| DE | 10 2007 003 209 | 7/2008 |
| DE | 10 2008 000 810 | 10/2009 |
| DE | 10 2008 040 145 | 1/2010 |

(Continued)

*Primary Examiner* — Lail Kleinman
(74) *Attorney, Agent, or Firm* — Norton Rose Fulbright US LLP; Gerard Messina

(57) ABSTRACT

A method for triggering at least one passenger protection means. The method includes a step of reading in a control signal which contains a command for carrying out an activation of the passenger protection means. Furthermore, method includes a step of releasing an activation of the passenger protection means as a response to the read-in control signal. Furthermore, the method includes a step of evaluating the control signal for the identification of the command for carrying out the activation of the passenger protection means and activating the passenger protection means as a response to an identified command for carrying out the activation of the passenger protection means to trigger the passenger protection means.

14 Claims, 2 Drawing Sheets

(56) References Cited

U.S. PATENT DOCUMENTS

2009/0066066 A1* 3/2009 Franke ............... B60R 21/0136
                                                            280/735
2014/0200773 A1* 7/2014 Wellhoefer .................... 701/45

FOREIGN PATENT DOCUMENTS

| DE | 10 2008 040 317 | 1/2010 |
| DE | 10 2010 031 123 | 1/2012 |
| DE | 10 2012 208 093 | 1/2013 |
| EP | 0 834 813 | 4/1998 |
| EP | 2 012 469 | 1/2009 |

* cited by examiner

METHOD AND CONTROL UNIT FOR TRIGGERING AT LEAST ONE PASSENGER PROTECTION MEANS

FIELD OF THE INVENTION

The present invention relates to a method for triggering at least one passenger protection means, to a corresponding control unit as well as to a corresponding computer program product.

BACKGROUND INFORMATION

Presently, an airbag control unit may include so-called standard PSI5 interfaces and an independent hardware path. The PSI5 interfaces are used to read in the external crash sensors of the airbag system. The sensor values are transmitted via the interface. If the sensor values exceed the thresholds predefined in the independent hardware path, this value is part of the release to trigger the squids. The second part of the release is formed from sensor signals of other crash sensors after processing in the crash algorithm. This part of the release is issued via an SPI transmission signal via the microcontroller in the airbag system.

SUMMARY

Against this background, a method for triggering at least one passenger protection means, furthermore a control unit which uses this method, as well as ultimately a corresponding computer program product are presented by the present invention.

The present invention provides a method for triggering at least one passenger protection means, the method having the following steps:
  reading in a control signal which contains a command for carrying out an activation of the passenger protection means;
  releasing an activation of the passenger protection means as a response to the read-in control signal;
  evaluating the control signal for the identification of the command for carrying out the activation of the passenger protection means; and
  activating the passenger protection means as a response to an identified command for carrying out the activation of the passenger protection means to trigger the passenger protection means.

A passenger protection means may, for example, be understood as a safety unit which ensures the protection of an occupant of a vehicle, or a pedestrian or a cyclist outside of the vehicle. For example, such a passenger protection means may be an airbag, a seat belt tensioner, or a similar safety unit which is provided in a vehicle for preventing or reducing the consequences of an accident. A control signal may, for example, be understood as a signal which was output by a data processing unit. This data processing unit may, for example, receive and evaluate one or multiple sensor signal(s) and use the information of the sensor signal(s) to form and provide the control signal. A command for carrying out an activation of the passenger protection means may, for example, be understood as a special code which causes an activation, in the form of an energization, for example, of the passenger protection means to be carried out by a control unit. Releasing an activation of the passenger protection means may, for example, be understood as preparing the passenger protection means, such as closing a switch, in order to be able to transmit a signal to the passenger protection means to trigger the latter. Evaluating the control signal may, for example, be understood as interpreting the content of the control signal in order to establish whether the command to carry out an activation of the passenger protection means is contained in the control signal. Activating the passenger protection means may be understood as outputting a signal to the passenger protection means which causes the passenger protection means to unfold its passenger protective function. For example, the activation of the passenger protection means may take place by energizing the triggering devices of the passenger protection means.

The present invention offers the advantage that, on the one hand, little outlay with regard to the required cable wires is needed to activate the passenger protection means and, on the other hand, very compact small units, which may be accommodated within a small available installation space, are implementable to ultimately activate a passenger protection means. This little outlay with regard to the required cable lines results from the fact that only one line is necessary to transmit the control signal. By evaluating the control signal in direct spatial proximity of the passenger protection means, structures, required for a double insurance of the activation of the passenger protection means, for releasing the passenger protection means, on the one hand, and for activating the passenger protection means, on the other hand, are made possible due to a significant shortening of the two lines required due to the double insurance of the activation. In this way, a long first line for transmitting the release signal and a long second line for transmitting the activating signal to the passenger protection means may be omitted, since only one line for transmitting the control signal must be wired into the spatial proximity of the passenger protection means. The possibility of implementing compact small units for activating the passenger protection means results from the fact that only one triggering unit is now to be provided which needs to check a control signal for containing a command for carrying out the activation of the passenger protection means; however, the triggering unit does not need to carry out a complex evaluation of sensor signals from different sensors which would require a considerably larger processor or microcontroller. Rather, the evaluation of the sensor signals may take place in a centrally situated sensor data evaluation device which may, for example, be situated in a place in the vehicle which has no installation limitations in contrast to the areas in the direct proximity of the passenger protection means.

Furthermore, the present invention provides a control unit which is designed to carry out, control, and implement the steps of the method according to the present invention in appropriate devices. This embodiment variant of the present invention in the form of a control unit also makes it possible to achieve the object underlying the present invention rapidly and efficiently.

In the present case, a control unit may be understood to be an electrical device which processes sensor signals and outputs control and/or data signals as a function thereof. The control unit may have an interface which may be implemented in hard- and/or software. In the case of hardware, the interfaces may, for example, be a part of a so-called system ASIC, which includes various functions of the control unit. It is, however, also possible that the interfaces are independent, integrated circuits or are at least partially made of discrete components. In the case of software, the interfaces may be software modules which are present on a microcontroller in addition to other software modules, for example.

A computer program product having program code is also advantageous, which may be stored on a machine-readable carrier, such as a semiconductor memory, a hard disk memory, or an optical memory, and is used for carrying out and/or controlling the steps of the method according to one of the specific embodiments described above when the program product is executed on a computer, a control unit, or a device.

One specific embodiment of the present invention is furthermore advantageous in which in the step of reading in, a control signal is read in which has an encoded command for carrying out an activation of the passenger protection means, the command being decoded in the step of evaluating the control signal. Such a specific embodiment of the present invention offers the advantage that the control signal is already pre-processed and contains the command for carrying out an activation of the passenger protection means already in an encoded state. For this reason, the evaluation may be implemented with the aid of technically very simple and numerically or circuitry-wise uncomplicated decoding of the command, whereby small and cost-effective control units may be used for implementing the above-proposed approach.

According to another specific embodiment of the present invention, the control signal may be read in by a PSI5 reading-in interface in the step of reading in. Such a specific embodiment of the present invention offers the advantage that the control signal may be transmitted via a simple and thus also cost-effectively available PSI5 interface or a PSI5 data transmission bus designed in this way.

Furthermore, according to another specific embodiment of the present invention, the passenger protection means may also be triggered by using a not-encoded activating signal in the step of evaluating and activating. Such a not-encoded activating signal may, for example, be understood as a simple energization of the ignition circuit or another type of triggering device of the passenger protection means which does not require further evaluation of the activating signal. Such a specific embodiment of the present invention offers the advantage that the triggering or activation of the passenger protection means may be ignited or triggered, i.e., activated, in a different manner without further delay, in particular without further processing of the signal for activating the passenger protection means. This makes possible a rapid activation of the passenger protection means upon receiving the control signal, so that the desirable functionality of the passenger protection means may be rapidly provided.

It is particularly advantageous when, according to another specific embodiment of the present invention, the identification of the command for carrying out the activation of the passenger protection means takes place in the step of evaluating when two different predefined sequences were recognized in the control signal, each representing a piece of information regarding an activation of the passenger protection means to be carried out. Such a specific embodiment of the present invention offers the advantage that a fault susceptibility of triggering the passenger protection means may be reduced if the passenger protection means is triggered only upon recognition of two different predefined sequences.

According to another specific embodiment of the present invention, the identification of the command for carrying out the activation of the passenger protection means may also take place in the step of evaluating when two identical predefined sequences were recognized in the control signal, each representing a piece of information regarding an activation of the passenger protection means to be carried out. Such a specific embodiment of the present invention offers the advantage of a very robust triggering of the passenger protection means, so that in the case of a faultily transmitted sequence, the passenger protection means may still be triggered if at least one of the sequences representing the triggering of the passenger protection means was recognized.

To ensure that an erroneous triggering of the passenger protection means is prevented, it is possible that the passenger protection means is triggered in the step of activating only if the command was identified in the control signal.

One specific embodiment of the present invention is particularly advantageous in which a step of pre-processing is also provided in which at least one sensor signal of a sensor is read in and is subsequently output as a response to the control signal when the at least one sensor signal meets a predetermined criterion. Such a predetermined criterion may, for example, be understood to be an exceedance of a value of the sensor signal beyond a predefined threshold. In particular, the step of pre-processing, on the one hand, and the steps of reading in, releasing, and evaluating, on the other hand, may be spatially separated, e.g., carried out in separate units. In particular, the steps of reading in, releasing, and evaluating may be carried out spatially closer to the passenger protection means than the step of pre-processing. Such a specific embodiment of the present invention offers the advantage that during pre-processing, a mostly numerical or circuitry-wise very complex linkage of one or multiple sensor signals and the making of a triggering decision is to be carried out which requires a larger processor and/or microcontroller. On the one hand, by processing the signals independently of one another in the steps of pre-processing and outputting the control signal and, on the other hand, by subsequently evaluating the control signal, the advantages of the present invention may be particularly stressed, namely that, on the one hand, fewer and shorter lines may be used and, on the other hand, smaller control units may be used for the actual activation of the passenger protection means.

One specific embodiment of the present invention, in which in the step of pre-processing, the control signal is output using a PSI5 transmission interface, is particularly advantageous with regard to a reliable and cost-effective data transmission of the control signal.

DETAILED DESCRIPTION

Figure 1:
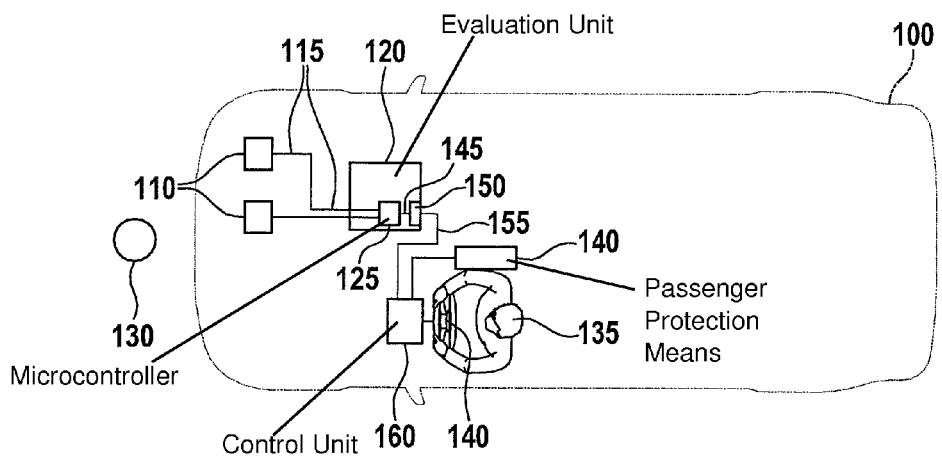
FIG. 1 shows a block diagram of a vehicle in which one exemplary embodiment of the present invention is implemented.

In the following description of preferred exemplary embodiments of the present invention, the elements which are illustrated in the various figures and appear to be similar are identified with identical or similar reference numerals; a repetitive description of these elements is dispensed with.

FIG. 1 shows a block diagram of a vehicle 100 in which one exemplary embodiment of the present invention is implemented as a control unit. Vehicle 100 includes multiple sensors 110 which may be designed as acceleration sensors, pressure sensors, structure-borne noise sensors, or the like, for example. Here, different sensors 110 may also detect different physical quantities; for example, a first sensor 110 may be designed as an acceleration sensor and a second sensor 110 may be designed as a pressure sensor. Sensors 110 each provide a sensor signal 115 which may be evaluated in an evaluation unit 120. For this purpose, evaluation unit 120 includes, for example, a microcontroller 125 in which sensor signals 115 are linked to one another according to a predetermined algorithm. If, for example, it is recognized during the evaluation of sensor signals 115 by the algorithm executed in microcontroller 125 that a collision of an object 130, e.g., of another vehicle, a tree, a pedestrian, or another object, would cause a risk to the safety or health of a vehicle occupant 135, a passenger protection means 140 may be activated by evaluation unit 120 or by microcontroller 125. Passenger protection means 140 may, for example, be a front airbag, a side airbag, a seat belt tensioner, a movable seat side wall or a similar safety means which prevents or at least reduces injury to vehicle occupant 135.

The activation of passenger protection means 140 by evaluation unit 120 or microcontroller 125 may be carried out in this case in such a way that a corresponding triggering command 145 is output by microcontroller 125 to an interface 150 of evaluation unit 120 which encodes triggering command 145 into a control signal 155 which is transmitted to a control unit 160. This control signal 155 may be encoded in a PSI5 data format, so that a twisted pair line may be used for the transmission of control signal 155. Such a transmission of control signal 155 enables a technically very simple transmission of control signal 155 to control unit 160. As the signal content, the release of a hardware path and encoded ignition sequences may be encoded in control signal 155, as will be described in the following in greater detail.

Figure 2:
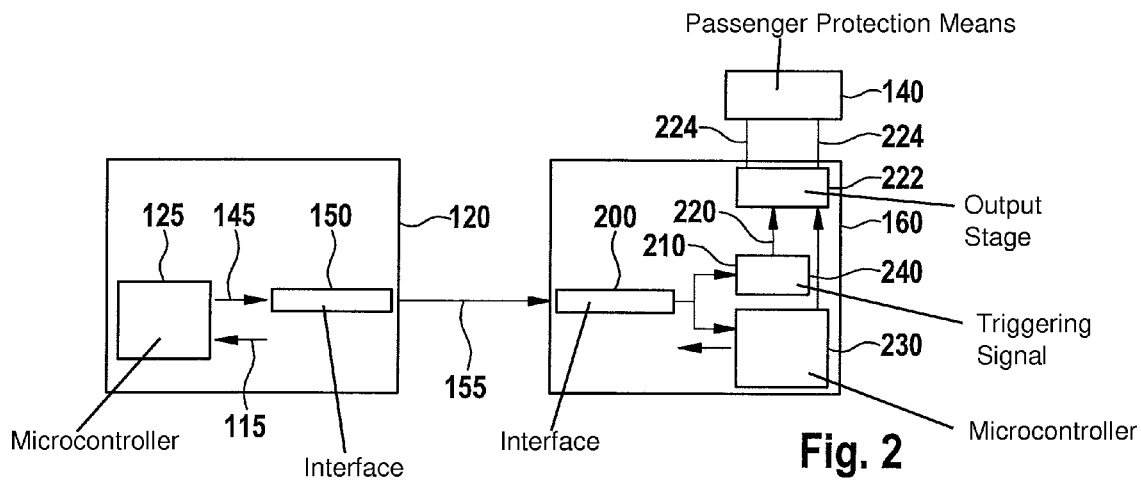
FIG. 2 shows a block diagram for illustrating the transmission and evaluation of the control signal from the evaluation unit to the control unit and the evaluation of the control signal in the control unit according to one exemplary embodiment of the present invention.

FIG. 2 shows a block diagram for illustrating the transmission of control signal 155 from evaluation unit 120, which is designed here as an airbag control unit having a connection to sensors 110, to control unit 160. Control unit 160 is used here as a triggering unit without direct contact to sensors 110. In evaluation unit 120, sensor signals 115, which are delivered by one, two, or multiple sensors 110, are read in first microcontroller 125 and are processed there according to a predefined algorithm. If it is determined during the processing in the algorithm that occupant 135 is endangered, a corresponding command 145 for activating passenger protection means 140 may be output by first microcontroller 125, the command being read in by interface 150 which is designed here as a PSI5 transmitter. The PSI5 transmitter thus outputs control signal 155 via a correspondingly designed data line from which it is read in by a corresponding control unit interface 200, which in the following represents a PSI5 receiver, in control unit 160. Control signal 155 is now analyzed in control unit interface 200.

Figure 3:
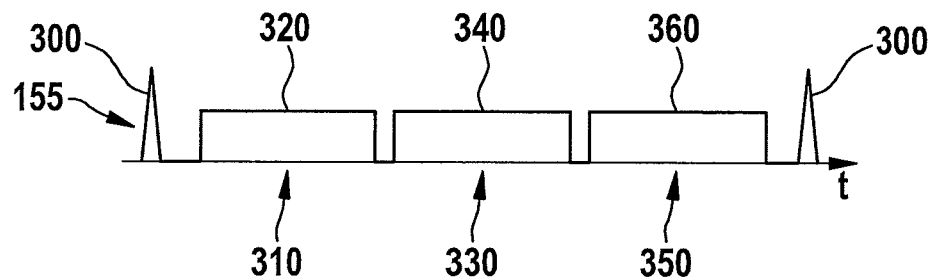
FIG. 3 shows a diagram of a chronological succession of sequences, which have a control signal, when they contain a command for activating a passenger protection means according to one exemplary embodiment of the present invention.

FIG. 3 shows a diagram of a chronological succession of sequences which may have a control signal 155 according to one exemplary embodiment of the present invention, when it contains a command for activating a passenger protection means 140. Here, a configuration of the transmission protocol pursuant to PSI5 v1.3 standard is used, for example. Following a synchronization pulse 300, a release command 320 is transmitted in a first time slot 310, a first ignition sequence 340 is chronologically transmitted in a second time slot 330, and a second ignition sequence 360 is transmitted chronologically successively in a third time slot 350, which is followed again, for example, by a synchronization pulse 300.

Now, if it is recognized in control unit interface 200 that a data sequence according to FIG. 3 is, for example, contained in control signal 155, the data sequence which is supposed to cause passenger protection means 140 to be triggered, a hardware path control unit 210 may be controlled by control unit interface 200 in such a way that in the case of a recognized release command 320, an ignition release signal 220 is output to passenger protection means 140, more precisely to a corresponding ignition circuit output stage 222 of an ignition circuit 224 for relevant passenger protection means 140, whereupon passenger protection means 140 is activated or triggered. Such a release signal 220 may, for example, cause the closing of a switch so that a subsequent control of the ignition circuits of passenger protection means 140 causes the triggering or activation of the relevant passenger protection means. As a result, a double insurance of the activation of passenger protection means 140 takes place to prevent an undesirable erroneous triggering of passenger protection means 140.

Furthermore, a signal may be output by control unit interface 120 to a second microcontroller 230 in which first ignition sequence 340 and second ignition sequence 360 contained in control signal 155 are contained. These ignition sequences 340 and 360 may be evaluated in second microcontroller 230 in order to determine that a command 145, by first microcontroller 125, for triggering passenger protection means 140 or multiple passenger protection means 140 is in fact contained. Now, if it is recognized by second microcontroller 230 that the activation of one or multiple passenger protection means 140 is in fact intended by first microcontroller 125, a corresponding triggering signal 240 may be transmitted by second microcontroller 230 to the one or multiple passenger protection means 140, more precisely to the ignition circuit(s) of relevant passenger protection means 140, in order to trigger or activate the one or multiple relevant passenger protection means 140. Such an activating or triggering may result in the unfolding of an airbag when passenger protection means 140 is designed as an airbag unit, for example. Triggering signal 240 may in this case also take place by simply energizing the relevant ignition circuit of passenger protection means 140.

To be able to particularly reliably ensure the activation of relevant passenger protection means 140, the evaluation of two or more ignition sequences 340 and 360 is carried out, so that in the event of an occurrence of a transmission fault during the transmission of control signal 155, it may still be ensured, for example, that the ignition circuit of relevant passenger protection means 140 may be activated or triggered in the presence of an ignition sequence 340 or 360 identifying the triggering of passenger protection means 140.

Such an approach, to transmit control signal 155 from an evaluation unit 120 to a control unit 160 and to only control the actual triggering of passenger protection means 140 by control unit 160, offers several advantages. Initially, a transmission line may be significantly shortened, since a line of ignition circuit 224 may be kept very short, when control unit 160 is situated in close proximity of passenger protection means 140, for example, the triggering of which control unit 160 is supposed to monitor or control. Furthermore, a very small and compact unit may be implemented for activating a relevant passenger protection means 140, since it is possible to use a significantly smaller evaluation module (e.g., as a semiconductor IC) with second microcontroller 230 than with first microcontroller 125 which should be able to carry out a more complex algorithm to process sensor signals 115. This results in the possibility of making good use of an installation space, which is very tight in most cases, in close proximity of passenger protection means 140 to be triggered by control unit 160, since the smaller, compact unit for activating the relevant passenger protection means 140 in the form of control unit 160 does not need to be very large. A safe and reliable transmission of control signal 155 is still possible by using very simple transmission technology which additionally has a cost-reducing effect. Such a simple and cost-effective transmission technology is in this case very important, in particular for a mass market such as the automotive industry.

In conclusion, it should be noted that an external unit 160 (control unit) should additionally be installed as an extension of airbag control unit 120 for triggering passenger protection means 140 in vehicle 100 according to one exemplary embodiment of the present invention. External unit 160 (here referred to as the control unit) does not have any internal sensors or any external sensors and is not in direct contact with such sensors. Therefore, sensor signals/acceleration values are not available. Due to the safety concept, the release via at least two paths for triggering cannot take place in this case. To expand the related art according to one exemplary embodiment of the present invention, a PSI5 transmitter 150 is implemented in airbag control unit 120, and a PSI5 receiver 200 is provided in external ignition unit 160. The transmission of control signal 155 pursuant to the PSI5 protocol includes in this case a simulated sensor value 145 or 320 (as a release signal or as a command for triggering the passenger protection means or an ignition circuit of the passenger protection means) as well as ignition sequences 340 and 360 for triggering squids 140 (or the passenger protection means itself). External unit 160 receives control signal 155 in the PSI5 protocol and releases the triggering of squids 140 through simulated sensor value 145 and 320 in conjunction with ignition sequences 340 and 360, respectively.

One important aspect of the present invention is to be seen in igniting pyrotechnical ignition elements, without having to evaluate a physically available sensor signal. Thus, an external placing of units for igniting squids may take place in this way, whereby less wiring material is required than according to the approaches of the related art. At the same time, small compact units 160, which are installable in a small predefined installation space, are implementable for igniting the passenger protection means.

First microcontroller 125 in airbag control unit 120 makes the triggering decision (i.e., a crash is recognized). It subsequently generates release signal 320 and ignition sequence 340, 360 which are initiated by activating pyrotechnical ignition elements 140. This information is transmitted via PSI5 transmitter 150 to PSI5 receiver 200 of triggering unit 160 (an exemplary transmission protocol may be used here according to the illustration in FIG. 3). Release signal 220 activates the hardware path. Ignition sequence 340 or 360 is evaluated by second microcontroller 230 and selected pyrotechnical ignition elements 140 are activated.

Figure 4:
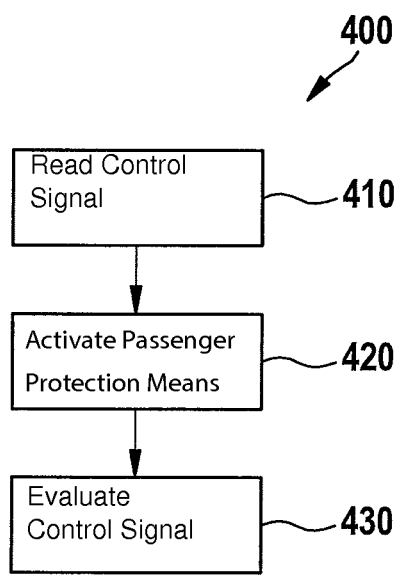
FIG. 4 shows a flow chart of a method according to one exemplary embodiment of the present invention as the method.

FIG. 4 shows a flow chart of an exemplary embodiment of the present invention as method 400 for triggering at least one passenger protection means. Method 400 includes a step of reading in 410 a control signal which contains a command for carrying out an activation of the passenger protection means. Furthermore, method 400 includes a step of releasing 420 an activation of the passenger protection means as a response to the read-in control signal. Ultimately, method 400 includes a step of evaluating 430 the control signal for the identification of the command for carrying out the activation of the passenger protection means and for activating the passenger protection means as a response to an identified command for carrying out the activation of the passenger protection means to trigger the passenger protection means.

The exemplary embodiments described and shown in the figures have only been selected as examples. Different exemplary embodiments may be combined with each other in their entirety or with regard to their individual characteristics. Also, one exemplary embodiment may be supplemented with characteristics of another exemplary embodiment.

Furthermore, method steps according to the present invention may be repeated and executed in a sequence different from the one described.

If an exemplary embodiment includes an "and/or" link between a first characteristic and a second characteristic, this should be read in such a way that the exemplary embodiment according to one specific embodiment has both the first characteristic and the second characteristic and according to another specific embodiment it has either only the first characteristic or only the second characteristic.

What is claimed is:

1. A method for triggering a passenger protection arrangement, the method comprising:
providing a control signal, from a transmitter of a first interface of an evaluation unit, having an ignition command including a data sequence to trigger the passenger protection arrangement;
recognizing, via a receiver of a second interface of a control unit, which is spatially proximate to the passenger protection arrangement, the ignition command including the data sequence in the control signal as a recognized release command; and
controlling a hardware path control unit, via the control unit interface, so that for the recognized release command, an ignition release signal is output by the hardware path control unit to the passenger protection arrangement, via an ignition circuit output stage of an ignition circuit, to trigger the passenger protection arrangement;
wherein the hardware path control unit is coupled to an output stage of the control unit,
wherein the evaluation unit and the control unit are physically separate from one another,
wherein the evaluation unit is coupled to the control unit, and wherein the control unit is coupled to the passenger protection arrangement,
wherein the evaluation unit provides the control signal, which is determined based on at least one sensor signal from at least one sensor, and
wherein the at least one sensor is coupled to the evaluation unit.

2. The method as recited in claim 1, wherein the ignition command is an encoded command for carrying out the activation of the passenger protection arrangement, the encoded command being decoded in evaluating the control signal.

3. The method as recited in claim 1, wherein the control signal is read in by a PSI5 reading-in interface, which is the receiver.

4. The method as recited in claim 1, wherein the ignition command is a non-encoded command.

5. The method as recited in claim 1, wherein the ignition command for carrying out the activation of the passenger protection arrangement is identified when two different sequences are recognized in the control signal, each sequence representing a piece of information regarding the activation of the passenger protection arrangement to be carried out.

6. The method as recited in claim 1, wherein the passenger protection arrangement is triggered in the activating only if the ignition command is identified in the control signal.

7. The method as recited in claim 1, further comprising:
pre-processing, in the evaluation unit, the at least one sensor signal of the at least one sensor, the pre-processing including reading in the sensor signal and subsequently outputting the sensor signal as a response to the control signal when the sensor signal meets a predetermined criterion.

8. The method as recited in claim 7, wherein in the pre-processing, the control signal is output using a PSI5 transmission interface, which is the transmitter.

9. A control system for triggering a passenger protection arrangement, comprising:
a control signal providing arrangement to provide a control signal having an ignition command including a data sequence to trigger the passenger protection arrangement, wherein the control signal providing arrangement includes a transmitter of a first interface of an evaluation unit; and
a recognizing arrangement to recognize, via a receiver of a second interface of a control unit, which is spatially proximate to the passenger protection arrangement, the ignition command including the data sequence in the control signal as a recognized release command;
wherein the control unit interface controls a hardware path control unit so that for the recognized release command, an ignition release signal is output by the hardware path control unit to the passenger protection arrangement, via an ignition circuit output stage of an ignition circuit, to trigger the passenger protection arrangement;
wherein the hardware path control unit is coupled to an output stage of the control unit,
wherein the evaluation unit and the control unit are physically separate from one another,
wherein the evaluation unit is coupled to the control unit, and wherein the control unit is coupled to the passenger protection arrangement,
wherein the evaluation unit provides the control signal, which is determined based on at least one sensor signal from at least one sensor, and
wherein the at least one sensor is coupled to the evaluation unit.

10. A non-transitory computer readable medium having a computer program, which is executable by a processor, comprising:
a program code arrangement having program code for triggering a passenger protection arrangement, by performing the following:
providing a control signal, from a transmitter of a first interface of an evaluation unit, having an ignition command including a data sequence to trigger the passenger protection arrangement;
recognizing, via a receiver of a second interface of a control unit, which is spatially proximate to the passenger protection arrangement, the ignition command including the data sequence in the control signal as a recognized release command; and
controlling a hardware path control unit, via the control unit interface, so that for the recognized release command, an ignition release signal is output by the hardware path control unit to the passenger protection arrangement, via an ignition circuit output stage of an ignition circuit, to trigger the passenger protection arrangement;
wherein the hardware path control unit is coupled to an output stage of the control unit,
wherein the evaluation unit and the control unit are physically separate from one another,
wherein the evaluation unit is coupled to the control unit, and wherein the control unit is coupled to the passenger protection arrangement,
wherein the evaluation unit provides the control signal, which is determined based on at least one sensor signal from at least one sensor, and
wherein the at least one sensor is coupled to the evaluation unit.

11. The method as recited in claim 1, wherein:
the releasing an activation of the passenger protection arrangement includes preparing the passenger protection arrangement for triggering; and
the activating the passenger protection arrangement includes causing the passenger protection arrangement to perform a passenger protective function.

12. The method as recited in claim 11, wherein the preparing the passenger protection arrangement includes closing a switch to permit control of an ignition circuit of the passenger protection arrangement.

13. The method as recited in claim 1, wherein the control signal includes:
a release command in a first time slot; and
at least one ignition sequence in at least one subsequent time slot as the ignition command.

14. The method as recited in claim 1, wherein the releasing and activating are in response to only a single control signal.

* * * * *